US011727672B1

United States Patent
Doshi et al.

(10) Patent No.: US 11,727,672 B1
(45) Date of Patent: Aug. 15, 2023

(54) SYSTEM AND METHOD FOR GENERATING TRAINING DATA SETS FOR SPECIMEN DEFECT DETECTION

(71) Applicant: Nanotronics Imaging, Inc., Cuyahoga Falls, OH (US)

(72) Inventors: Anuj Doshi, Long Island City, NY (US); Jonathan Lee, Brooklyn, NY (US); John B. Putman, Celebration, FL (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

(21) Appl. No.: 17/938,885

(22) Filed: Oct. 7, 2022

Related U.S. Application Data

(60) Provisional application No. 63/365,247, filed on May 24, 2022.

(51) Int. Cl.
  *G06K 9/62* (2022.01)
  *G06V 10/774* (2022.01)
  *G06T 7/00* (2017.01)
  *G06V 10/22* (2022.01)

(52) U.S. Cl.
  CPC ............ *G06V 10/774* (2022.01); *G06T 7/001* (2013.01); *G06V 10/235* (2022.01); *G06T 2207/20104* (2013.01)

(58) Field of Classification Search
  CPC .... G06V 10/774; G06V 10/235; G06T 7/001; G06T 2207/20104
  See application file for complete search history.

(56) References Cited

U.S. PATENT DOCUMENTS

| | | | |
|---|---|---|---|
| 2016/0357389 A1* | 12/2016 | Dakin | G06F 3/04883 |
| 2018/0232601 A1* | 8/2018 | Feng | G06V 10/82 |
| 2019/0220525 A1* | 7/2019 | Song | G06V 10/774 |
| 2019/0294923 A1* | 9/2019 | Riley | G06K 9/6267 |
| 2019/0355113 A1* | 11/2019 | Wirch | G06F 3/04845 |
| 2022/0207684 A1* | 6/2022 | Sugino | G06T 7/001 |

\* cited by examiner

*Primary Examiner* — Samir A Ahmed
(74) *Attorney, Agent, or Firm* — DLA Piper LLP (US)

(57) ABSTRACT

A system and method for generating a training data set for training a machine learning model to detect defects in specimens is described herein. A computing system cause presentation of an image on a device of a user. The image includes at least one defect on an example specimen. The computing system receives an annotated image from the user. The user annotated the image using an input via the device. The input includes a first indication of a location of the defect and a second indication of a class corresponding to the defect. The computing system adjusts the annotated image to standardize the input based on an error profile of the user and the class corresponding to the defect. The computing system uploads the annotated image for training the machine learning model.

17 Claims, 6 Drawing Sheets

SYSTEM AND METHOD FOR GENERATING TRAINING DATA SETS FOR SPECIMEN DEFECT DETECTION

CROSS-REFERENCE TO RELATED APPLICATIONS

This application claims priority to U.S. application Ser. No. 63/365,247, filed May 24, 2022, which is hereby incorporated by reference in its entirety.

FIELD OF DISCLOSURE

The present disclosure generally relates to a system and method for generating training data sets, such as, for example, for training a machine learning model to detect defects on a specimen.

BACKGROUND

Inspection of specimens, such as substrates and photomasks, for defects and other characteristics is important for manufacturing processes. For example, in the semiconductor manufacturing space, since the entire semiconductor manufacturing process involves hundreds of steps, it is important to detect defects on the substrate or mask early in the manufacturing process.

SUMMARY

In some embodiments, a method for generating a training data set for training a machine learning model to detect defects in specimens is disclosed herein. A computing system causes presentation of an image on a device of a user. The image includes a defect on an example specimen. The computing system receives an annotated image from the user. The user annotated the image using an input via the device. The input includes a first indication of a location of the defect and a second indication of a class corresponding to the defect. The computing system adjusts the annotated image to standardize the input based on an error profile of the user and the class corresponding to the defect. The error profile indicates how to adjust the first indication of the user. The computing system outputs the annotated image for training the machine learning model.

In some embodiments, a system is disclosed herein. The system includes a processor and a memory. The memory has programming instructions stored thereon, which, when executed by the processor, causes the processor to perform operations. The operations include causing presentation of an image on a device of a user. The image includes a defect on an example specimen. The operations further include receiving an annotated image from the user. The user annotated the image using an input via the device. The input includes a first indication of a location of the defect and a second indication of a class corresponding to the defect. The operations further include adjusting the annotated image to standardize the input based on an error profile of the user and the class corresponding to the defect. The error profile indicates how to adjust the first indication of the user. The operations further include uploading the annotated image for training a machine learning model to detect defects on a specimen.

In some embodiments, a non-transitory computer readable medium is disclosed herein. The non-transitory computer readable medium includes one or more sequences of instructions, which, when executed by a processor, causes a computing system to perform operations. The operations include causing, by the computing system, presentation of an image on a device of a user. The image includes a defect on an example specimen. The operations further include receiving, by the computing system, an annotated image from the user. The user annotated the image using an input via the device. The input includes a first indication of a location of the defect and a second indication of a class corresponding to the defect. The operations further include adjusting, by the computing system, the annotated image to standardize the input based on an error profile of the user and the class corresponding to the defect. The error profile indicates how to adjust the first indication of the user. The operations further include uploading, by the computing system, the annotated image for training a machine learning model to detect defects on a specimen.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
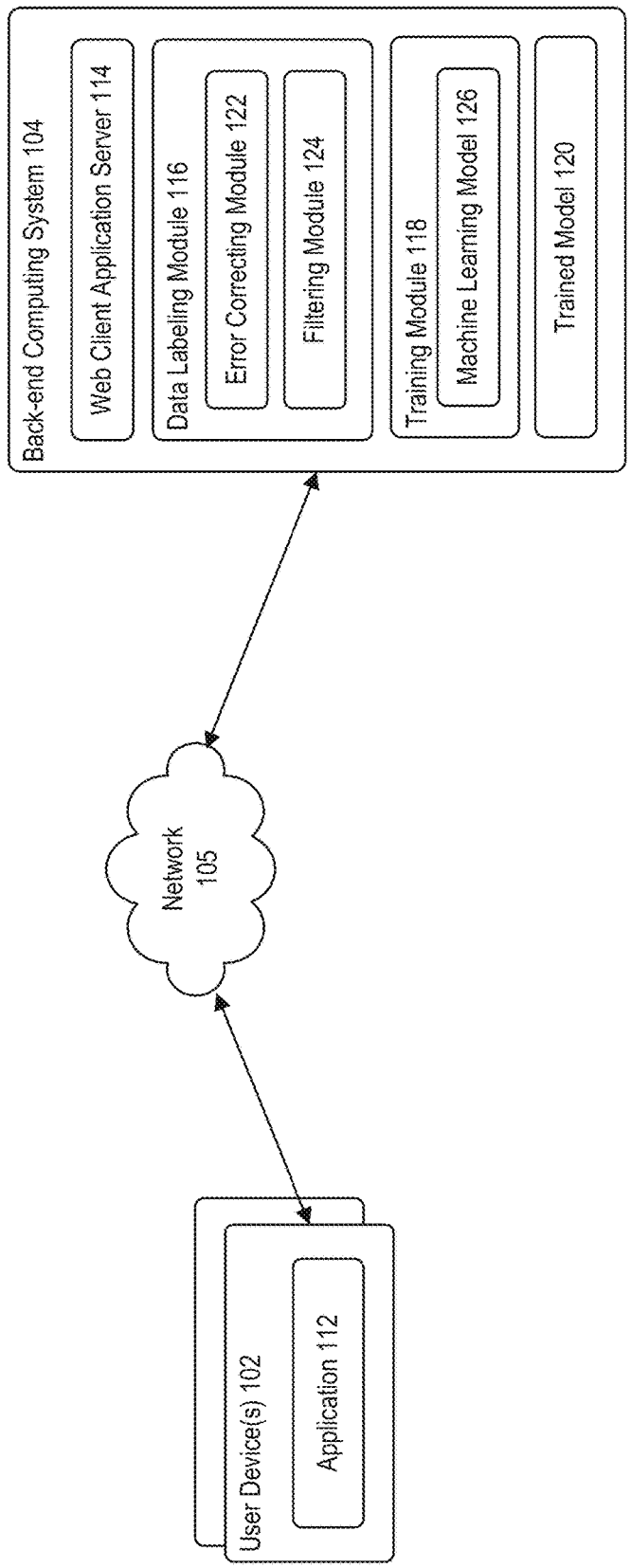
FIG. 1 is a block diagram illustrating an exemplary computing environment, according to example embodiments.

As those skilled in the art of machine learning and artificial intelligence understand, the accuracy of a machine learning or artificial intelligence model is contingent upon the quality of the training data that is used to train the model. In the field of defect detection on specimens, conventionally, administrators or engineers would need to annotate images for training models to detect such defects. This tagged data in the form of annotated images is an extremely important source of information for most modern image classifiers and object detectors including deep learning based models. The quality and quantity of this data directly affects the training quality and inference performance of these classifiers.

There are, however, inherent limitations in generating annotated images. In particular, one of the larger issues with generating annotated images is that it requires skilled professionals to tag these images, and with the range of tools currently available, the process can easily get very tiring and time-consuming. Due to the non-intuitive interface of the available tools the tagging process induces mental and physical fatigue over time which can lead to reduce accuracy in tagged images and reduce tagging speed. The reduction in accuracy can have adverse effects on the trained model, as it would be more difficult for the model to obtain a desired level of accuracy due to the reduction in accuracy of the tagged images.

While many large, annotated datasets are available such as the Common Objects in Context (CO-CO) dataset, the image classes that they contain are of very common objects which usually do not cover most objects in an industrial setting or even slightly more refined domains. Furthermore, the object to image size ratio for such datasets is almost fairly distributed which is not the case for more refined domains. As a result, one of the few remaining options to generate accurate classifiers in such domains is to require manual tagging of images specific to the domain. While one may argue that transferable techniques such as transfer-learning can be used for these refined domains, the retraining of such models still requires a sizable amount of tagged data.

Most existing tools that offer image annotation are based browse-and-click methods where a user must select an object and click or drag the cursor around an instance of that object in the image. This conventional approach, while popular industry-wide for its accuracy and effectiveness, suffer from the above recited accuracy flaws.

One or more techniques described herein improves upon conventional processes by providing a more intelligent approach to annotating images for training by reducing or minimizing human error. For example, rather than requiring a user to click and drag a mouse pointer around object instances in an image to mark them, one or more techniques described herein utilize a tablet-based approach, in which the user uses a stylus/smart pencil device to encircle instances of objects in an image. The process does not end there, however. To ensure uniformity and accuracy in the training data, the current approach may utilize an error-correcting algorithm and a filtering algorithm. For example, the system may be configured to automatically filter instances in their classes and automatically correct any error induced by user specific tagging patterns. Such an approach makes the entire task of annotating images less strenuous, much faster, and more intuitive than other tools currently available.

FIG. 1 is a block diagram illustrating an exemplary computing environment 100, according to example embodiments. Computing environment 100 may include at least one or more user devices 102 and a back-end computing system 104 communicating via network 105.

Network 105 may be of any suitable type, including individual connections via the Internet, such as cellular or Wi-Fi networks. In some embodiments, network 105 may connect terminals, ser-vices, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

User device 102 may be operated by a user. In some embodiments, user device 102 may be operated by a user involved in the generation of training data for a machine learning model. User device 102 may be representative of a mobile device, a tablet, a desktop computer, or any computing system having the capabilities described herein. For example, user device 102 may be representative of a mobile device, a tablet, a desktop computer, or any computer system that allows the user to draw shapes and figures on the image, for example, by using an input device, such as, but not limited to, a keyboard, a finger, a mouse, or a stylus.

User device 102 may include at least application 112. Application 112 may be representative of an application associated with back-end computing system 104. In some embodiments, application 112 may be a standalone application associated with back-end computing system 104. In some embodiments, application 112 may be representative of a web browser configured to communicate with back-end computing system 104. In some embodiments, user device 102 may communicate over network 105 to request a webpage, for example, from web client application server 114 of back-end computing system 104. For example, user device 102 may be configured to execute application 112 to label training data for a machine learning model. For example, via application 112, a user can utilize touchscreen capability of user device 102 to annotate images for training a machine learning model.

The content that is displayed to user device 102 may be transmitted from web client application server 114 to user device 102, and subsequently processed by application 112 for display through a graphical user interface (GUI) of user device 102.

Back-end computing system 104 may include web client application server 114, data labeling module 116, and training module 118. Each of data labeling module 116 and training module 118 may be comprised of one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As stated above, application 112 may allow users to manually annotate an image for the purpose of generating training data to train a machine learning model. Labeling module 116 may be configured to ensure that the annotations are consistent both on the individual user level, as well as across users. Data labeling module 116 may be configured to prompt the user to create a "tagging profile." For example, data labeling module 116 may create a tagging profile for the user by prompting the user to tag a few sample images, which have some regular shapes in them and annotation ground truths for them. Based on the tagging input, data labeling module 116 can generate an error profile for the user based on how the user has tagged the images. Various metrics are profiled to understand the user's individualized patterns in tagging. For example, a target training process may involve training the machine learning model to detect m-classes of objects or defects. For each class, the user may use a different color to denote the class of the defect. Such training process may involve providing the machine learning model with correctly annotated images, such that the machine learning model can learn how the user tags each class of defect. Once trained, data labeling module 116 can deploy the machine learning model to use the user's tagging profile and error profile to automatically adjust the user's annotations.

In some embodiments, data labeling module 116 may continue to adjust the user's tagging profile periodically recalibrating the user's error profile. For example, after every k images (e.g., where k is a hyperparameter for error profile reset), the user may be presented with a few random sample images, such as that described above. Using the inputs to the sample images, data labeling module 116 may recalibrate the error profile for the user. Such periodic recalibrating can help take into account the user's current fatigue level, tagging pattern, tagging speed, and the like.

During operation, data labeling module 116 may receive annotated images from user device 102 via application 112. Data labeling module 116 may then begin adjusting the user's annotations based on the user's tagging profile.

As shown, data labeling module 116 may include error correcting module 122 and filtering module 124. Filtering module 124 may be configured to classify each defect that the user has annotated in the image. For example, based on the predefined colors assigned to each defect class, filtering module 124 may segregate each defect instance into their respective defect class. Such filtering may assist in determining how to adjust the user's annotations for each defect class type.

Error correcting module 122 may be configured to correct for any errors in the user's annotations. For example, error correcting module 122 may be configured to correct for any errors in the user's annotations based on the user's tagging profile and error profile. For example, in operation, when an annotated image is received by error correcting module 122, error correcting module may convert the user's annotations to a regular shape (e.g., shapes predefined by application 112). Such conversion may assist error correcting module 122 in comparing the user's annotations to the user's error profile. Once converted, error correcting module 122 may apply the user's error profile to the converted annotations to modify the user's annotations. Such correcting may ensure that the corpus of training images, which may be generated by multiple end users annotating images, includes consistent annotations across users.

In some embodiments, some machine learning models may require annotations to be formatted to a specific shape. For example, some machine learning models may require annotations to be in form of a bounding box. In another example, some machine learning models may require different annotations, such as, but not limited to circles and ellipses. Depending on the annotation format required by the machine learning model, error correcting module 122 may transform or translate the shape of the annotation to the required shape. All the information associated with the original annotations (e.g., pre-transformation/translation) may be stored as meta information for the annotations. This allows the images to be used across multiple annotation formats.

Training module 118 may be configured to train machine learning model 126 to generate a trained model 120. Training module 118 may train machine learning model 126 using the standardized image sets generated by data labeling module 116.

In some embodiments, machine learning model 126 may be representative of a shape regression model that may utilize an intersection over union (IOU) based loss function. In some embodiments, the IOU based loss function may be one of a vanilla IOU based loss function, a generalized IOU based loss function, a distance IOU based loss function, or a complete IOUS based loss function. In some embodiments, the IOU based loss function may be used to calculate the loss between tagged contour and expected contour for the shapes of the sample image presented to the user at the start of a tagging session and/or after every k images. In some embodiments, the shape regression based model based on an IOU based loss function may learn how closely the user's tags match the ground truth tags. In some embodiments, the shape regression model may learn a user's tagging pattern for different shapes based on this loss, and for a particular subset of images. In some embodiments, the shape regression model may adjust a user's tagged shapes as per the average loss of all the sample images until that particular or target image.

In some embodiments, machine learning model 126 may be representative of one or more machine learning models. Exemplary machine learning models or algorithms may include, but are not limited to, random forest model, support vector machines, neural networks, deep learning models, Bayesian algorithms, Temporal Convolutional Networks, and the like.

Once trained, trained model 120 may be deployed to detect defects on specimens. Exemplary specimens may include, but are not limited to, substrates, photomasks, optical lenses, and lithography plates.

Those skilled in the art understand that, in some embodiments, rather than having the components associated with application 112 centrally hosted, such as via back-end computing system 104, data labeling module 116, training module 118, and/or trained model 120 may exist locally on user device 102. In other words, rather than rely on communications with web client application server 114 for accessing functionality of data labeling module 116, training module 118, and/or trained model 120, a user can access such functionality locally via user device 102, without needing to be connected to network 105.

Figure 2B:
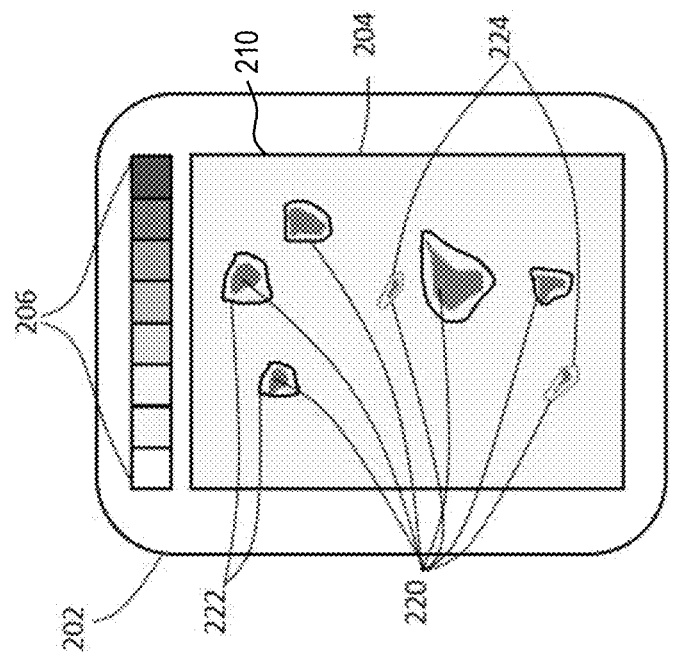
FIG. 2B is a block diagram illustrating an exemplary user device, according to example embodiments.
Figure 2A:
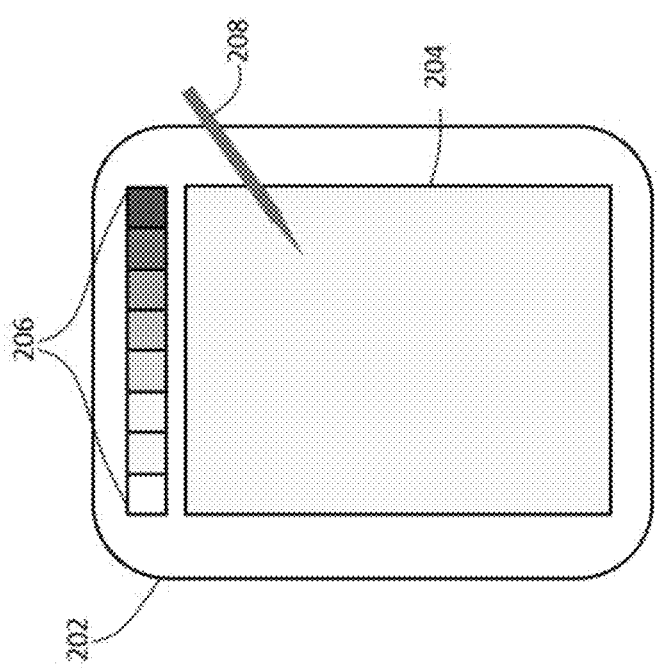
FIG. 2A is a block diagram illustrating an exemplary user device, according to example embodiments.

FIG. 2A is a block diagram illustrating an exemplary user device 202, according to example embodiments. User device 202 may correspond to user device 102 discussed above in conjunction with FIG. 1. As shown, user device 202 may take the form of a touchscreen device, such as, but not limited to, a tablet, mobile device, laptop, and the like. User device 202 may include an input interface 204. In some embodiments, input interface 204 may be an input interface. A user of user device 202 may use an input device, such as their hand (e.g., at least one finger) or a stylus 208 (e.g., smart pencil device), to provide input to user device 202 via input interface 204.

Input interface 204 may include a color pallet 206. Color pallet 206 may allow the user to select a color before annotating a specific defect shown via input interface 204. In some embodiments, color pallet 206 may correspond to the various classes of defects described above. In this manner, by simply annotating the image, the user can provide input in the form of where the defect is located on the image and the class associated with the defect.

In some embodiments, data labeling module 116 may include a sub-module or algorithm that may suggest to the user colors for tagging images based on a general distribution of colors across the dataset. Such suggestions may assist the user in selecting contrasting colors that will result in sharper boundaries, thus assisting filtering module 124 in more clearly identifying classes of defects.

FIG. 2B is a block diagram illustrating exemplary user device 202, according to example embodiments. As shown, input interface 204 is displaying an image 210. A user of user device 202 can use stylus 208 to annotate image 210. For example, image 210 may include a plurality of defects 220. A user of user device 202 has annotated plurality of defects 220 by drawing a shape that surrounds each defect 220. Plurality of defects 220 may include two classes of defects, as indicated by the user's annotations. For example, as shown, the user has annotated a first set of defects 222 with a first color from color pallet 206; similarly, the user has annotated a second set of defects 224 with a second color from color pallet 206.

Further, as illustrated in FIG. 2B, the annotations are not uniform about any given defect. For example, as shown, an annotation identifying any given defect is not uniform itself; further, annotations across image 210 are also not uniform. In other words, the user has simply annotated image 210 to identify defects and their class without regard to how accurate their annotations are. Such input is possible due to the functionality of data labeling module 116, which is described in more detail below, in conjunction with FIGS. 2C-2F.

Figure 2D:
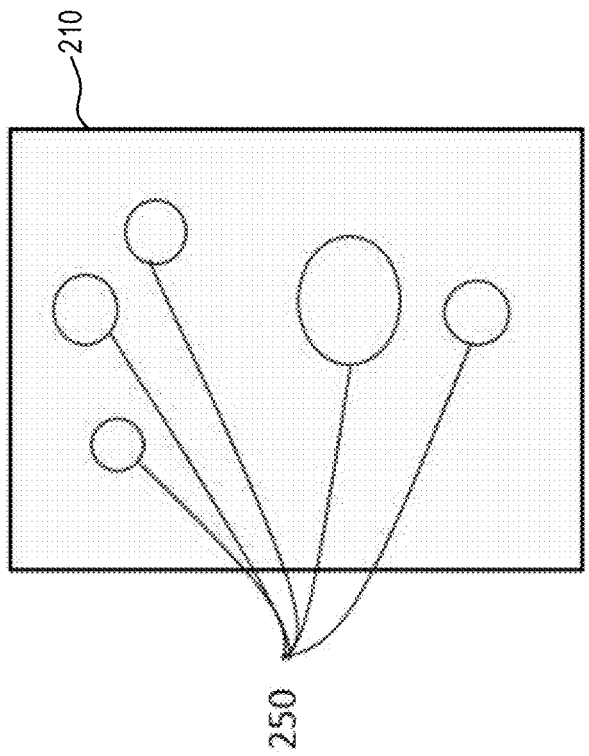
FIG. 2D is a block diagram illustrating exemplary annotated image, according to example embodiments.
Figure 2C:
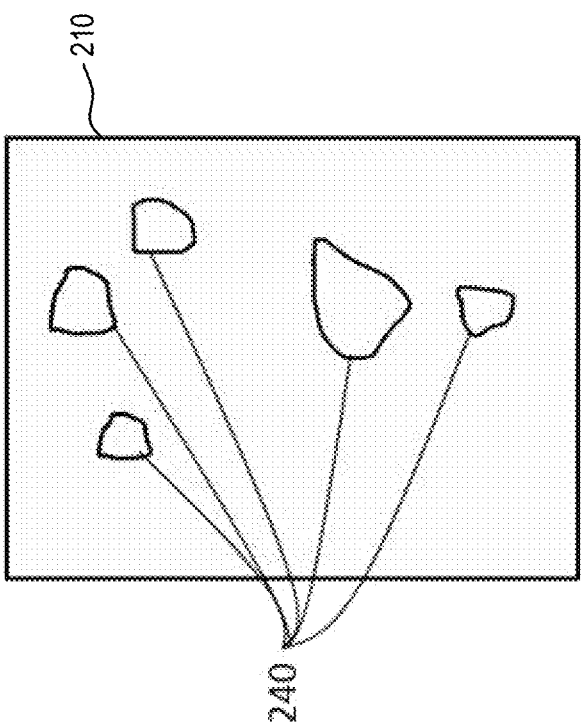
FIG. 2C is a block diagram illustrating exemplary annotated image, according to example embodiments.

FIG. 2C is a block diagram illustrating exemplary annotated image 210, according to example embodiments. For ease of illustration, only annotated image 210 is shown.

When annotated image 210 is provided by the user, data labeling module 116 may initiated a workflow to standardize the user's annotations. For example, as shown, filtering module 124 may classify each defect that the user has annotated in the image. For example, based on the predefined colors assigned to each defect class, filtering module 124 may segregate each defect instance into their respective defect class. Such filtering may assist in determining how to adjust the user's annotations for each defect class type. As shown, this only leaves annotations 240, which may correspond to first set of defects 222.

FIG. 2D is a block diagram illustrating exemplary annotated image 210, according to example embodiments. For ease of illustration, only annotated image 210 is shown.

Following filtering by filtering module 124, error correcting module 122 may begin its workflow to correct or adjust the annotations provided by the user. For example, error correcting module 122 may correct for any errors in the user's annotations based on the user's tagging profile and error profile. As shown, error correcting module 122 may smooth the user's annotations 240 into elliptical annotations 250.

Figure 2F:
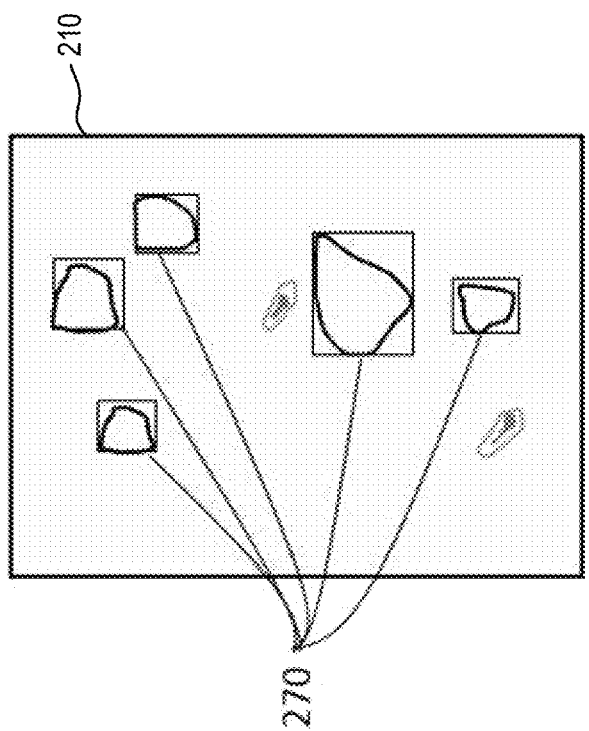
FIG. 2F is a block diagram illustrating exemplary annotated image, according to example embodiments.
Figure 2E:
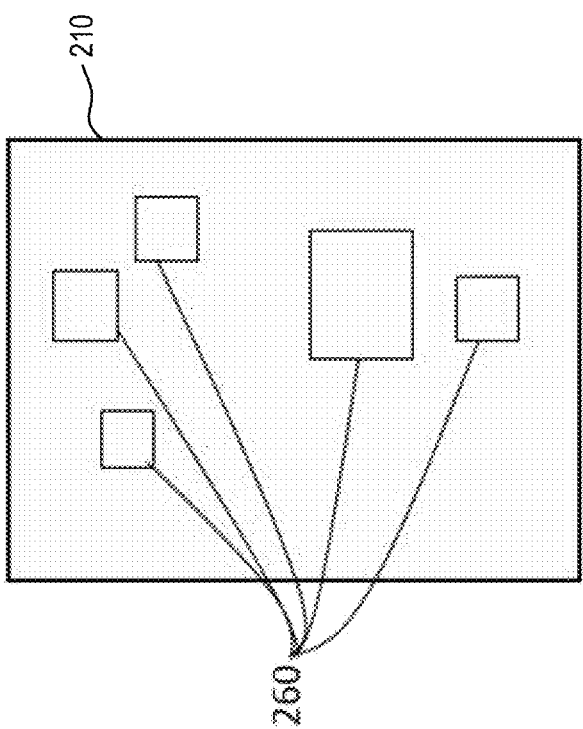
FIG. 2E is a block diagram illustrating exemplary annotated image, according to example embodiments.

FIG. 2E is a block diagram illustrating exemplary annotated image 210, according to example embodiments. For ease of illustration, only annotated image 210 is shown.

In some embodiments, error correcting module 122 may further convert the user's annotations to a regular shape (e.g., shapes predefined by application 112). In the present example, the regular shape may take the form of rectangle. Accordingly, error correcting module 122 may convert the elliptical annotations 250 in FIG. 2D to rectangular annotations 260.

FIG. 2F is a block diagram illustrating exemplary annotated image 210, according to example embodiments. For ease of illustration, only annotated image 210 is shown.

As shown, the standardized, rectangular annotations 260 are shown overlaying first set of defects 222 (reference numeral "270"). As those skilled in the art understand, such rectangular annotations 260 closely surround each defect 222.

In some embodiments, the above processes may be performed for each defect class, such as second set of defects 224.

Figure 3:
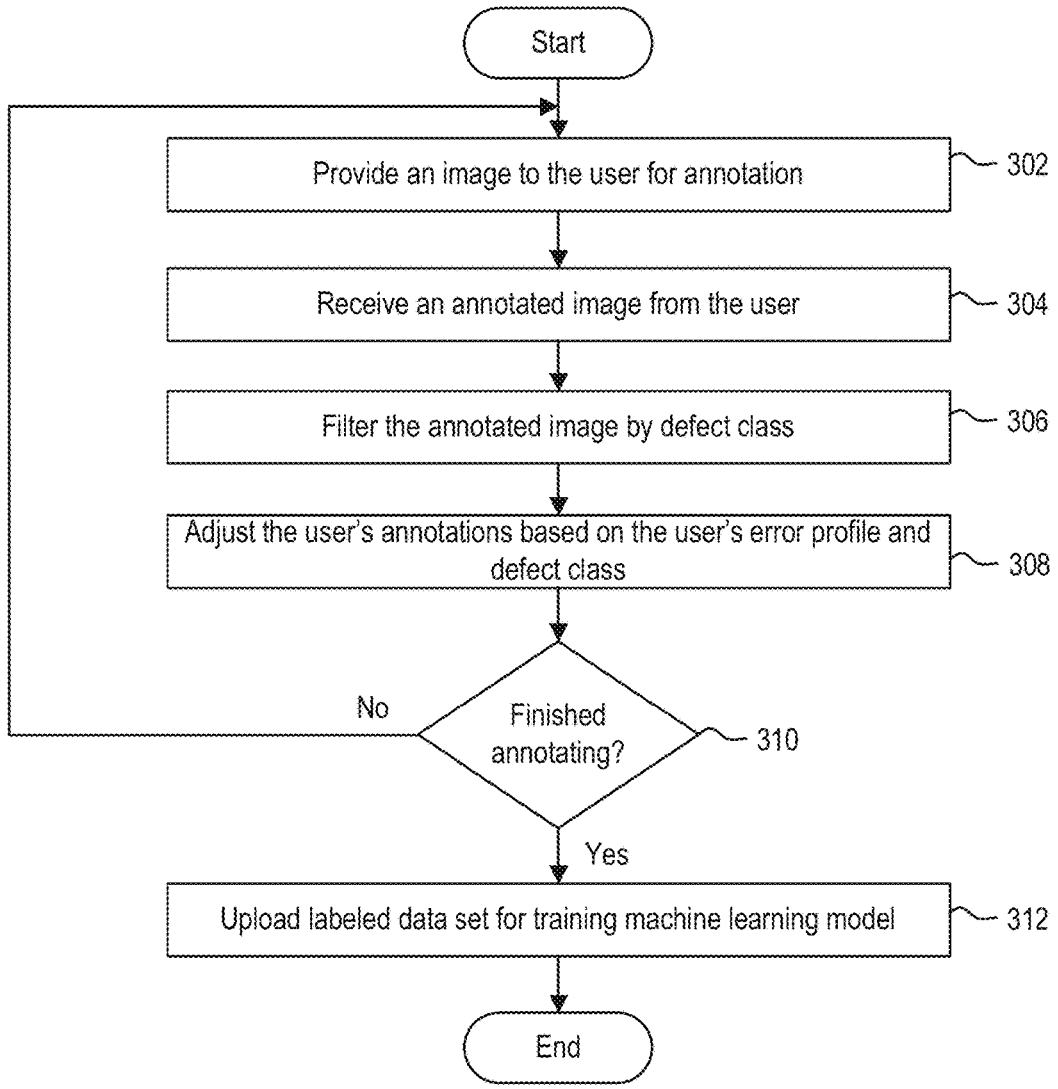
FIG. 3 is a flow diagram illustrating a method of generating a training data set for training a machine learning model to detect defects, according to example embodiments.

FIG. 3 is a flow diagram illustrating a method 300 of generating a training data set for training a machine learning model 126 to detect defects, according to example embodiments. Method 300 may begin at step 302.

At step 302, back-end computing system 104 may provide an image to the user for annotation. For example, data labeling module 116 may identify a set of images for annotation. In some embodiments, the set of images may be provided to data labeling module 116 by an administrator. In some embodiments, the set of images may be provided to data labeling module 116 by the user. Providing the image to the user for annotation may include data labeling module 116 causing user device 102 to display the image to the user via application 112.

At step 304, back-end computing system 104 may receive an annotated image from the user. For example, a user may annotate the image via a input interface of user device 102. In some embodiments, a user of user device 102 can use a stylus or a finger to annotate the image. Generally, the user of user device 102 may annotate the image to identify a plurality of defects illustrated in the image for purposes of training machine learning model 126. For example, a user of user device 102 can annotate the image by drawing a shape that surrounds each defect illustrated in the image.

In some embodiments, either application 112, user, administrator, or data labeling module 116 can define a color pallet for the labeling. The color pallet may correspond to various classes of defects. For example, a first color in a color pallet may correspond to a first defect type, a second color in the color pallet may correspond to a second defect type, and the like. The color pallet may allow the user to select a color before annotating a specific defect. In this manner, by simply annotating the image, the user can provide input in the form of where the defect is located on the image and the class associated with the defect.

At step 306, back-end computing system 104 may filter the annotated image by defect class. For example, filtering module 124 may be configured to classify each defect that the user has annotated in the image. For example, based on the predefined colors assigned to each defect class, filtering module 124 may segregate each defect instance into their respective defect class. Such filtering may assist in determining how to adjust the user's annotations for each defect class type.

At step 308, back-end computing system 104 may adjust the user's annotations based on the user's error profile and the defect class of each defect. For example, for each defect class, error correcting module 122 may correct for any errors in the user's annotations based on the user's tagging profile and error profile. For example, when an annotated image is received by error correcting module 122, error correcting module may convert the user's annotations to a regular shape (e.g., shapes predefined by application 112). Such conversion may assist error correcting module 122 in comparing the user's annotations to the user's error profile. Once converted, error correcting module 122 may apply the user's error profile to the converted annotations to modify the user's annotations. Such correcting may ensure that the corpus of training images, which may be generated by multiple end users annotating images, includes consistent annotations across users.

In some embodiments, some machine learning models may require annotations to be formatted to a specific shape. For example, some machine learning models may require annotations to be in form of a bounding box. In another example, some machine learning models may require different annotations, such as, but not limited to circles and ellipses. Depending on the annotation format required by the machine learning model, error correcting module 122 may transform or translate the shape of the annotation to the required shape. All the information associated with the original annotations (e.g., pre-transformation/translation) may be stored as meta information for the annotations. This allows the images to be used across multiple annotation formats.

At step 310, back-end computing system 104 may determine whether the user is finished annotating images for training. If, at step 310, back-end computing system 104 determines that there are additional images for annotating, then method 300 may revert to step 302 and another image may be provided to the user for annotation.

If, however, at step 310, back-end computing system 104 determines that there are not any additional images for annotation, then method 300 may proceed to step 312. At step 312, back-end computing system 104 may upload the labeled data set for training machine learning model 126. For example, training module 118 may be configured to use the labeled training data set to train machine learning model 126 to detect defects in images of specimens. Once trained, training module 118 may generate trained model 120 that can be deployed in a specimen inspection system.

Figure 4A:
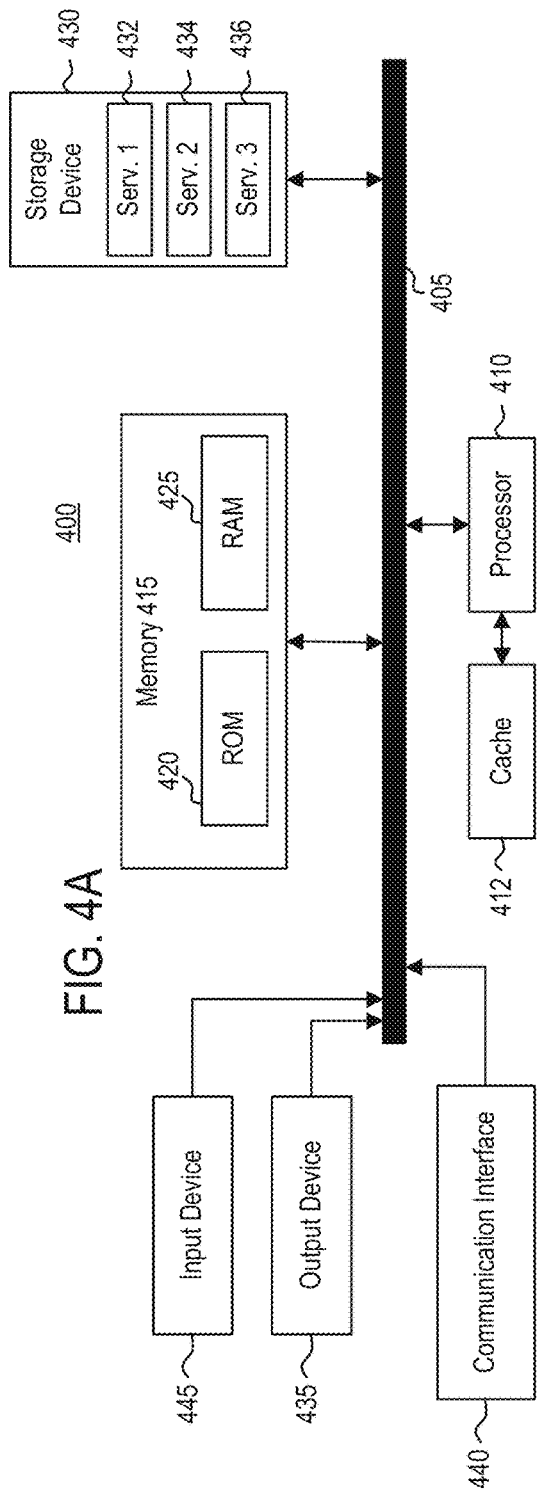
FIG. 4A is a block diagram illustrating a computing device, according to example embodiments.

FIG. 4A illustrates a system bus architecture of computing system 400, according to example embodiments. System 400 may be representative of at least a portion of user device 102 and/or back-end computing system 104. One or more components of system 400 may be in electrical communication with each other using a bus 405. System 400 may include a processing unit (CPU or processor) 410 and a system bus 405 that couples various system components including the system memory 415, such as read only memory (ROM) 420 and random access memory (RAM) 425, to processor 410. System 400 may include a cache of high-speed memory connected directly with, in close proximity to, or integrated as part of processor 410. System 400 may copy data from memory 415 and/or storage device 430 to cache 412 for quick access by processor 410. In this way, cache 412 may provide a performance boost that avoids processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general purpose processor and a hardware module or software module, such as service 1 432, service 2 434, and service 3 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system 400, an input device 445 may represent any number of input mechanisms, such as a microphone for speech, a touch-sensitive screen for gesture or graphical input, keyboard, mouse, motion input, speech and so forth. An output device 435 may also be one or more of a number of output mechanisms known to those of skill in the art. In some instances, multimodal systems may enable a user to provide multiple types of input to communicate with computing system 400. Communications interface 440 may generally govern and manage the user input and system output. There is no restriction on operating on any particular hardware arrangement and therefore the basic features here may easily be substituted for improved hardware or firmware arrangements as they are developed.

Storage device 430 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 may include services 432, 434, and 436 for controlling the processor 410. Other hardware or software modules are contemplated. Storage device 430 may be connected to system bus 405. In one aspect, a hardware module that performs a particular function may include the software component stored in a computer-readable medium in connection with the necessary hardware components, such as processor 410, bus 405, output device 435 (e.g., display), and so forth, to carry out the function.

Figure 4B:
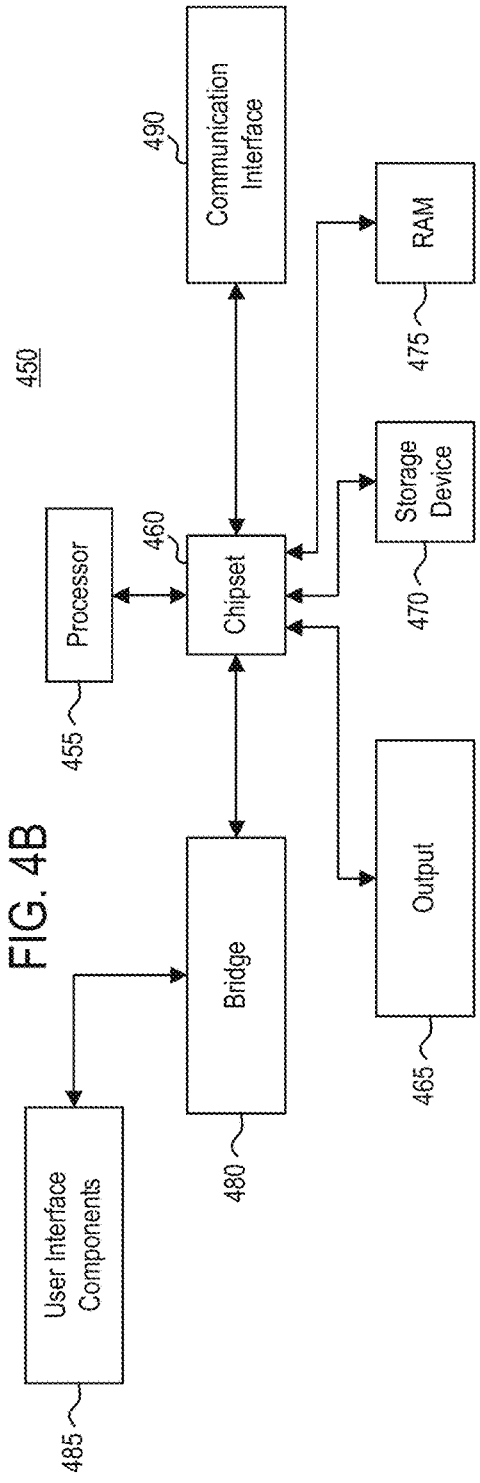
FIG. 4B is a block diagram illustrating a computing device, according to example embodiments.

FIG. 4B illustrates a computer system 450 having a chipset architecture that may represent at least a portion of user device 102 and/or back-end computing system 104. Computer system 450 may be an example of computer hardware, software, and firmware that may be used to implement the disclosed technology. System 450 may include a processor 455, representative of any number of physically and/or logically distinct resources capable of executing software, firmware, and hardware configured to perform identified computations. Processor 455 may communicate with a chipset 460 that may control input to and output from processor 455. In this example, chipset 460 outputs information to output 465, such as a display, and may read and write information to storage device 470, which may include magnetic media, and solid state media, for example. Chipset 460 may also read data from and write data to storage device 475 (e.g., RAM). A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. In general, inputs to system 450 may come from any of a variety of sources, machine generated and/or human generated.

Chipset 460 may also interface with one or more communication interfaces 490 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 455 analyzing data stored in storage device 470 or storage device 475. Further, the machine may receive inputs from a user through user interface components 485 and execute appropriate functions, such as browsing functions by interpreting these inputs using processor 455.

It may be appreciated that example systems 400 and 450 may have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for generating a training data set for training a machine learning model to detect defects in specimens, the method comprising:
   causing, by a computing system, presentation of a plurality of training images on a device of a user, wherein each training image of the plurality of training images comprises at least one training defect;
   receiving, by the computing system, a plurality of training annotated images from the user based on the plurality of training images, wherein each plurality of training annotated images comprises a further indication of a location of each training defect;
   learning, by the computing system, an individualized defect labeling pattern of the user based on the plurality of training annotated images;
   generating, by the computing system, an error profile of the user based on the individualized defect labeling pattern of the user, wherein the error profile defines how to adjust annotations of the user;
   causing, by the computing system, presentation of an image on the device of the user, the image comprising a defect on an example specimen;
   receiving, by the computing system, an annotated image from the user, wherein the user annotated the image using an input via the device, wherein the input comprises a first indication of a location of the defect and a second indication of a class corresponding to the defect;
   adjusting, by the computing system, the annotated image to standardize the input based on the error profile of the user and the class corresponding to the defect, wherein the error profile indicates how to adjust the first indication of the user; and
   outputting, by the computing system, the annotated image for training the machine learning model.

2. The method of claim 1, wherein the annotated image comprises a second input, the second input comprising a third indication of a second location of a second defect and a fourth indication of a second class corresponding to the second defect.

3. The method of claim 2, further comprising:
   filtering, by the computing system, the annotated image by class type.

4. The method of claim 1, wherein adjusting, by the computing system, the annotated image to standardize the input based on the error profile of the user and the class corresponding to the defect comprises:
   converting the first indication to a default shape; and
   adjusting the default shape based on the error profile.

5. The method of claim 4, further comprising:
   transform the adjusted default shape into a second shape dictated by a type of the machine learning model.

6. The method of claim 1, further comprising:
   defining, by the computing system, a color pallet for the annotations, wherein each color in the color pallet corresponds to a specific class of defects.

7. A system, comprising:
   a processor; and
   a memory having programming instructions stored thereon, which, when executed by the processor, causes the processor to perform operations comprising:
      causing presentation of a plurality of training images on a device of a user, wherein each training image of the plurality of training images comprises at least one training defect;
      receiving a plurality of training annotated images from the user based on the plurality of training images, wherein each plurality of training annotated images comprises a further indication of a location of each training defect;
      learning an individualized defect labeling pattern of the user based on the plurality of training annotated images;
      generating an error profile of the user based on the individualized defect labeling pattern of the user, wherein the error profile defines how to adjust annotations of the user;
      causing presentation of an image on the device of the user, the image comprising a defect on an example specimen;
      receiving an annotated image from the user, wherein the user annotated the image using an input via the device, wherein the input comprises a first indication of a location of the defect and a second indication of a class corresponding to the defect;

adjusting the annotated image to standardize the input based on the error profile of the user and the class corresponding to the defect, wherein the error profile indicates how to adjust the first indication of the user; and uploading the annotated image for training a machine learning model to detect defects on a specimen.

8. The system of claim 7, wherein the annotated image comprises a second input, the second input comprising a third indication of a second location of a second defect and a fourth indication of a second class corresponding to the second defect.

9. The system of claim 8, wherein the operations further comprise:

filtering the annotated image by class type.

10. The system of claim 7, wherein adjusting the annotated image to standardize the input based on the error profile of the user and the class corresponding to the defect comprises:

converting the first indication to a default shape; and
adjusting the default shape based on the error profile.

11. The system of claim 10, further comprising:

transform the adjusted default shape into a second shape dictated by a type of the machine learning model.

12. The system of claim 7, wherein the operations further comprise:

defining a color pallet for the annotations, wherein each color in the color pallet corresponds to a specific class of defects.

13. A non-transitory computer readable medium comprising one or more sequences of instructions, which, when executed by a processor, causes a computing system to perform operations comprising:

causing, by the computing system, presentation of a plurality of training images on a device of a user, wherein each training image of the plurality of training images comprises at least one training defect;

receiving, by the computing system, a plurality of training annotated images from the user based on the plurality of training images, wherein each plurality of training annotated images comprises a further indication of a location of each training defect;

learning, by the computing system, an individualized defect labeling pattern of the user based on the plurality of training annotated images;

generating, by the computing system, an error profile of the user based on the individualized defect labeling pattern of the user, wherein the error profile defines how to adjust annotations of the user;

causing, by the computing system, presentation of an image on the device of the user, the image comprising a defect on an example specimen;

receiving, by the computing system, an annotated image from the user, wherein the user annotated the image using an input via the device, wherein the input comprises a first indication of a location of the defect and a second indication of a class corresponding to the defect;

adjusting, by the computing system, the annotated image to standardize the input based on the error profile of the user and the class corresponding to the defect, wherein the error profile indicates how to adjust the first indication of the user; and uploading, by the computing system, the annotated image for training a machine learning model to detect defects on a specimen.

14. The non-transitory computer readable medium of claim 13, wherein the annotated image comprises a second input, the second input comprising a third indication of a second location of a second defect and a fourth indication of a second class corresponding to the second defect.

15. The non-transitory computer readable medium of claim 14, further comprising:

filtering, by the computing system, the annotated image by class type.

16. The non-transitory computer readable medium of claim 13, wherein adjusting, by the computing system, the annotated image to standardize the input based on the error profile of the user and the class corresponding to the defect comprises:

converting the first indication to a default shape; and
adjusting the default shape based on the error profile.

17. The non-transitory computer readable medium of claim 16, further comprising:

transform the adjusted default shape into a second shape dictated by a type of the machine learning model.

* * * * *